(12) United States Patent
Nishio et al.

(10) Patent No.: US 7,364,529 B2
(45) Date of Patent: Apr. 29, 2008

(54) CONTROL DEVICE FOR HYDRAULIC AUTOMATIC TRANSMISSION FOR VEHICLE

(75) Inventors: Shinichi Nishio, Wako (JP); Yoshiyuki Nagayama, Wako (JP); Hiroyuki Takeo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 11/246,101

(22) Filed: Oct. 11, 2005

(65) Prior Publication Data

US 2006/0079373 A1   Apr. 13, 2006

(30) Foreign Application Priority Data

Oct. 12, 2004   (JP) ............................. 2004-298041

(51) Int. Cl.
*F16H 59/00*   (2006.01)
(52) U.S. Cl. ...................................................... 477/98
(58) Field of Classification Search ................ 477/97, 477/98, 76, 72
See application file for complete search history.

(56) References Cited

U.S. PATENT DOCUMENTS 5,976,056 A * 11/1999 Matsumoto et al. ........ 477/125

6,602,163 B2 * 8/2003 Tamura et al. ................. 477/98
6,915,681 B2 * 7/2005 Kaigawa et al. ........... 73/118.1

FOREIGN PATENT DOCUMENTS

| JP | 7-71584 | 3/1995 |
| JP | 8-247275 | 9/1996 |
| JP | 8-277922 | 10/1996 |
| JP | 10205616 A * | 8/1998 |
| JP | 3266320 | 1/2002 |

* cited by examiner

*Primary Examiner*—Tisha Lewis
(74) *Attorney, Agent, or Firm*—Westerman, Hattori, Daniels & Adrian, LLP.

(57) ABSTRACT

A control device for a hydraulic automatic transmission for a vehicle, including start control device for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position; temperature detecting device for detecting the temperature of a power train; and high-speed position setting operation inhibiting device for inhibiting a high-speed position setting operation by the start control device in the case that the temperature detected by the temperature detecting device is greater than or equal to a predetermined value.

8 Claims, 7 Drawing Sheets

CONTROL DEVICE FOR HYDRAULIC AUTOMATIC TRANSMISSION FOR VEHICLE

BACKGROUND OF THE INVENTION

1. Field of the Invention

The present invention generally relates to a control device for a hydraulic automatic transmission, and more particularly to a control device for a hydraulic automatic transmission for performing start control such that a shift position is switched through a predetermined high-speed position to a start position in performing a select operation from a nonforward range such as a neutral range (N range) and a reverse range (R range) to a forward range such as a drive range (D range). In this specification, the switching control from the N range to the forward range is referred to as in-gear control.

2. Description of the Related Art

In general, an automatic transmission mounted on a vehicle includes a torque converter, a shift mechanism, and a plurality of hydraulic engaging elements (frictional engaging elements) such as clutches and brakes for switching power transmitting paths in this shift mechanism. These hydraulic engaging elements are engaged automatically according to an operational condition of the vehicle or selectively according to the switching of ranges by a manual operation by a driver, thereby obtaining a desired shift position. In this kind of automatic transmission, the engagement or disengagement of each hydraulic engaging element is controlled by supplying or discharging a hydraulic pressure.

In this kind of automatic transmission, there is a problem that an uncomfortable shock called an ND shock may occur in performing a select operation from the neutral range to the drive range at starting the vehicle. More specifically, in such an N-D select operation, a neutral condition where all the hydraulic engaging elements are disengaged is switched to a drive condition where a predetermined hydraulic engaging element is engaged to obtain a first-speed position as a shift position. At this time, the output torque of an engine is transmitted to wheels at an increased ratio corresponding to the reduction ratio of the first-speed position, so that this large torque transmission causes the uncomfortable shock to passengers in the vehicle.

In other words, while the in-gear control is the control for switching the neutral range as an unloaded condition to the forward range (or reverse range), the input torque to the transmission at this time is small and the ratio of transmitted torque fluctuations to changes in engagement capacity of the hydraulic engaging element is large, resulting in the occurrence of the uncomfortable shock. Therefore, greatly delicate control is required for the engagement control of the hydraulic engaging element in performing the in-gear control. Various control methods on the in-gear control have been proposed in the prior art. For example, in switching the neutral range to the forward range, a high-speed shift position is temporarily set and a first-speed position (starting shift position) is thereafter set.

This control is referred to as squat control, whereby the output torque change in switching the neutral range to the forward range can be smoothened to thereby reduce a shift shock in performing the in-gear control. For example, in a shift control method disclosed in Japanese Patent Publication No. Hei 3-6390, a high-speed shift position is once set and a first-speed position is thereafter set when a manual shift lever is moved from the neutral range to the forward range in the condition where a depression force applied to an accelerator pedal has been removed and a parking brake is applied at a vehicle speed near zero.

In this kind of automatic transmission, the engagement or disengagement of each hydraulic engaging element (frictional engaging element) is controlled by a hydraulic pressure. Accordingly, at a low temperature, the viscosity of a working fluid increases to cause an increase in time required for switching the shift position to the starting position. As a result, there is a possibility that the starting characteristics of the vehicle may be degraded. A control device solving this problem has been proposed in Japanese Patent No. 3266320. In this control device for an automatic transmission, a high-speed position setting operation is inhibited at starting when the temperature of a power unit as detected by temperature detecting means is lower than a predetermined value.

The viscosity of the working fluid decreases with an increase in temperature, causing a reduction in controlled hydraulic pressure in response to a control command value. Accordingly, it is difficult to stably supply the working fluid to the hydraulic engaging elements for a plurality of shift positions. Thus, the conventional control device has such a problem that the starting characteristics at a high temperature are degraded. Further, this problem occurs also in the case that the high-speed shift position is used at a predetermined frequency or more in a given period of time to cause an increase in temperature of the hydraulic engaging element such as a clutch.

SUMMARY OF THE INVENTION

It is therefore an object of the present invention to provide a control device for a hydraulic automatic transmission which can prevent a degradation in starting characteristics when the temperature of a power train is high.

It is another object of the present invention to provide a control device for a hydraulic automatic transmission which can prevent a degradation in starting characteristics when the temperature of a hydraulic engaging element such as a clutch is high.

In accordance with a first aspect of the present invention, there is provided a control device for a hydraulic automatic transmission for a vehicle, including start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position; temperature detecting means for detecting the temperature of a power train; and high-speed position setting operation inhibiting means for inhibiting a high-speed position setting operation by the start control means in case that the temperature detected by the temperature detecting means is greater than or equal to a predetermined value.

According to the first aspect, the high-speed position setting operation by the start control means is inhibited in case that the temperature of the power train is greater than or equal to a predetermined value. Accordingly, even when the viscosity of a working fluid lowers, a controlled hydraulic pressure (working fluid pressure) to the start control means can be stably supplied in response to a control command value, so that it is possible to prevent a degradation in starting characteristics when the temperature of the power train is high.

In accordance with a second aspect of the present invention, there is provided a control device for a hydraulic automatic transmission for a vehicle, including start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position; temperature detecting means for detecting the temperature of a power train; hydraulic pressure detecting means for detecting a hydraulic pressure to be supplied to the second hydraulic engaging element; and high-speed position setting operation inhibiting means for inhibiting a high-speed position setting operation by the start control means in case that the temperature detected by the temperature detecting means is greater than or equal to a predetermined value and that the hydraulic pressure detected by the hydraulic pressure detecting means is less than a predetermined value in a given period of time.

According to the second aspect, the high-speed position setting operation by the start control means is inhibited in case that the temperature of the power train is greater than or equal to a predetermined value and that the hydraulic pressure to be supplied to the second hydraulic engaging element is less than a predetermined value in a given period of time. Accordingly, finer control can be achieved as compared with the control device according to claim 1, and a similar effect can be obtained.

In accordance with a third aspect of the present invention, there is provided a control device for a hydraulic automatic transmission for a vehicle, including start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position; temperature detecting means for detecting the temperature of a power train; vehicle speed detecting means for detecting a vehicle speed; rotational speed detecting means for detecting the rotational speed of an input shaft of the transmission; and high-speed position setting operation inhibiting means for inhibiting a high-speed position setting operation by the start control means in case that the temperature detected by the temperature detecting means is greater than or equal to a predetermined value, that the vehicle speed detected by the vehicle speed detecting means is less than or equal to a predetermined value, and that the rotational speed detected by the rotational speed detecting means is greater than a predetermined value.

According to the third aspect, the high-speed position setting operation by the start control means is inhibited in case that the temperature of the power train is greater than or equal to a predetermined value, that the vehicle speed is less than or equal to a predetermined value, and that the rotational speed of the input shaft of the transmission is greater than a predetermined value. Accordingly, finer control can be achieved as compared with the control device according to claim 1, and a similar effect can be obtained.

In accordance with a fourth aspect of the present invention, there is provided a control device for a hydraulic automatic transmission for a vehicle, including start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position; temperature detecting means for detecting the temperature of a power train; hydraulic pressure detecting means for detecting a hydraulic pressure to be supplied to the second hydraulic engaging element; vehicle speed detecting means for detecting a vehicle speed; rotational speed detecting means for detecting the rotational speed of an input shaft of the transmission; and high-speed position setting operation inhibiting means for inhibiting a high-speed position setting operation by the start control means in case that the temperature detected by the temperature detecting means is greater than or equal to a predetermined value, that the hydraulic pressure detected by the hydraulic pressure detecting means is less than a predetermined value in a given period of time, that the vehicle speed detected by the vehicle speed detecting means is less than or equal to a predetermined value, and that the rotational speed detected by the rotational speed detecting means is greater than a predetermined value.

According to the fourth aspect, the high-speed position setting operation by the start control means is inhibited in case that the temperature of the power train is greater than or equal to a predetermined value, that the hydraulic pressure to be supplied to the second hydraulic engaging element is less than a predetermined value in a given period of time, that the vehicle speed is less than or equal to a predetermined value, and that the rotational speed of the input shaft of the transmission is greater than a predetermined value. Accordingly, very fine start control at starting can be achieved, and a similar effect as obtained by the control device according to claim 1 can be obtained.

In accordance with a fifth aspect of the present invention, there is provided a control device for a hydraulic automatic transmission for a vehicle, including start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position; temperature detecting means for detecting the temperature of the second hydraulic engaging element; and high-speed position setting operation inhibiting means for inhibiting a high-speed position setting operation by the start control means in case that the temperature detected by the temperature detecting means is greater than a predetermined value.

According to the fifth aspect, the high-speed position setting operation by the start control means is inhibited in case that the temperature of the second hydraulic engaging element is greater than a predetermined value. Accordingly, it is possible to prevent a degradation in starting characteristics when the temperature of the second hydraulic engaging element is high. Furthermore, a cooling effect for the second hydraulic engaging element can also be obtained.

In accordance with a sixth aspect of the present invention, there is provided a control device for a hydraulic automatic transmission for a vehicle, including start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position; operation frequency detecting means for detecting the frequency of operations of the second hydraulic engaging element; and high-speed position setting operation inhibiting means for inhibiting a high-speed position setting operation by the start control means in case that the frequency of operations detected by the frequency operation detecting means is greater than a predetermined value.

Preferably, the operation frequency detecting means detects the number of operations of the second hydraulic engaging element per given time.

Alternatively, the operation frequency detecting means detects the time of operations of the second hydraulic engaging element per given time.

According to the sixth aspect, the high-speed position setting operation by the start control means is inhibited in case that the frequency of operations of the second hydraulic engaging element is greater than a predetermined value. Accordingly, an increase in the frequency of operations of the second hydraulic engaging element is considered to be equivalent to an increase in the temperature of the second hydraulic engaging element, so that it is possible to prevent a degradation in starting characteristics when the frequency of operations of the second hydraulic engaging element is high. Furthermore, a cooling effect for the second hydraulic engaging element can also be obtained.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

The control device of the present invention is applicable to an automatic transmission including a torque converter, a shift mechanism consisting of a plurality of planetary gear sets, and a plurality of clutches and a plurality of brakes for switching power transmitting paths in this shift mechanism. The control device of the present invention is applicable also to a parallel axes type automatic transmission including a torque converter, a shift mechanism having a plurality of shift gear trains, and a plurality of clutches for switching power transmitting paths in this shift mechanism.

Figure 1:
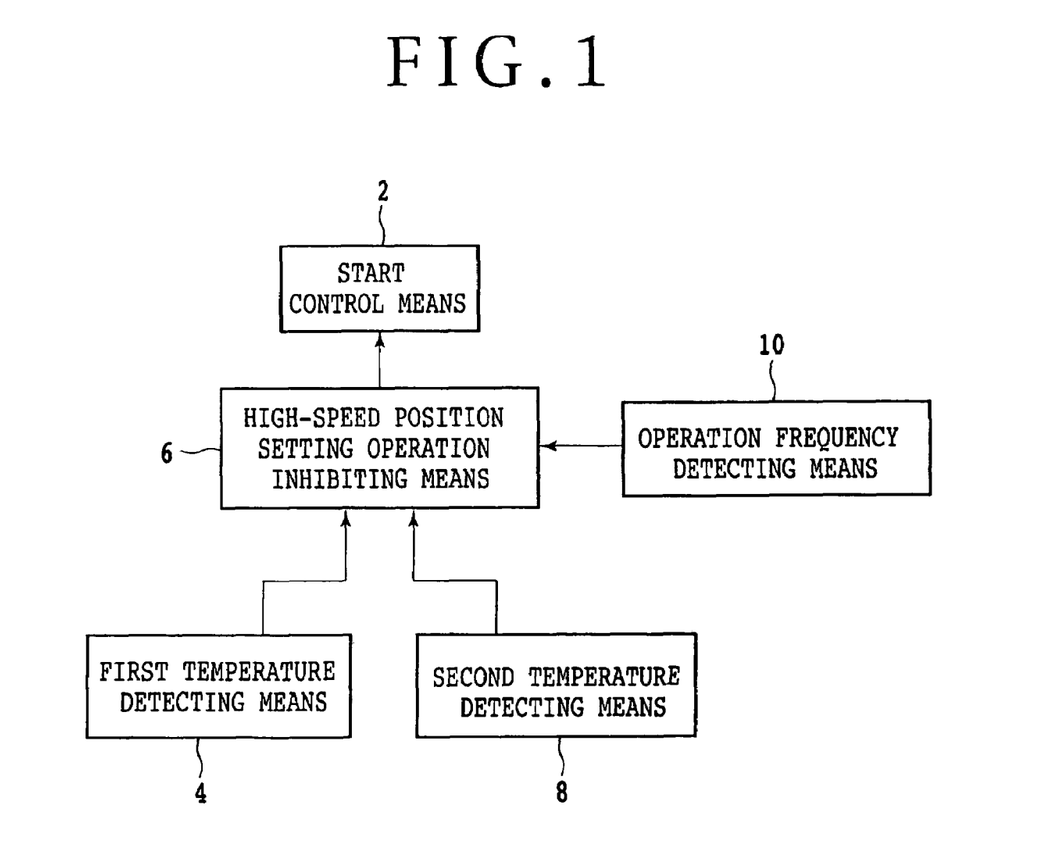
FIG. 1 is a block diagram showing the configuration of a first preferred embodiment of the present invention.

A control device according to a first preferred embodiment of the present invention will now be described with reference to the block diagram of FIG. 1. The control device for the automatic transmission according to this preferred embodiment includes start control means 2 for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position. First temperature detecting means 4 is provided to detect the temperature of a power train, e.g., the temperature of a working fluid for the transmission. Second temperature detecting means 8 is provided to detect the temperature of the second hydraulic engaging element.

Operation frequency detecting means 10 is provided to detect the frequency of operations of the second hydraulic engaging element. More specifically, the operation frequency detecting means 10 detects the number of operations of the second hydraulic engaging element per given time or detects the time of operations of the second hydraulic engaging element per given time. High-speed position setting operation inhibiting means 6 is provided to inhibit a high-speed position setting operation by the start control means 2 in the case that the temperature detected by the first temperature detecting means 4 is greater than or equal to a predetermined value, that the temperature detected by the second temperature detecting means 8 is greater than a predetermined value, or that the frequency of operations detected by the operation frequency detecting means 10 is greater than a predetermined value.

A control method by the control device according to the first preferred embodiment mentioned above will now be described in detail with reference to the flowchart of FIG. 2. In step S10, high-speed control means operation frequency calculation processing is executed. This calculation processing is executed by a subroutine as shown in FIG. 3, for example. In step S20 in FIG. 3, it is determined whether or not shift control is being performed. If the answer in step S20 is affirmative, the program proceeds to step S21 to execute high-speed control means operation frequency addition processing. For example, when the subroutine shown in FIG. 3 is executed every 5 ms, "1" is added to the operation frequency every 5 ms in the case that the shift control is being performed.

If the answer in step S20 is negative, the program proceeds to step S22 to execute high-speed control means operation frequency subtraction processing. Specifically, "1" is subtracted from the operation frequency in the case that the shift control is not being performed. The determination in step S20 is made for all the high-speed positions except the first-speed position. While the number of operations of the high-speed control means is calculated in the subroutine shown in FIG. 3, the time of operations of the high-speed control means may be calculated as a modification. In this case, when the subroutine is executed every 5 ms, the time of 5 ms is added to the operation frequency every time the subroutine is executed in the case that the shift control is being performed. If the shift control is not being performed, neither the addition nor subtraction processing is performed, but the subroutine is ended.

Figure 2:
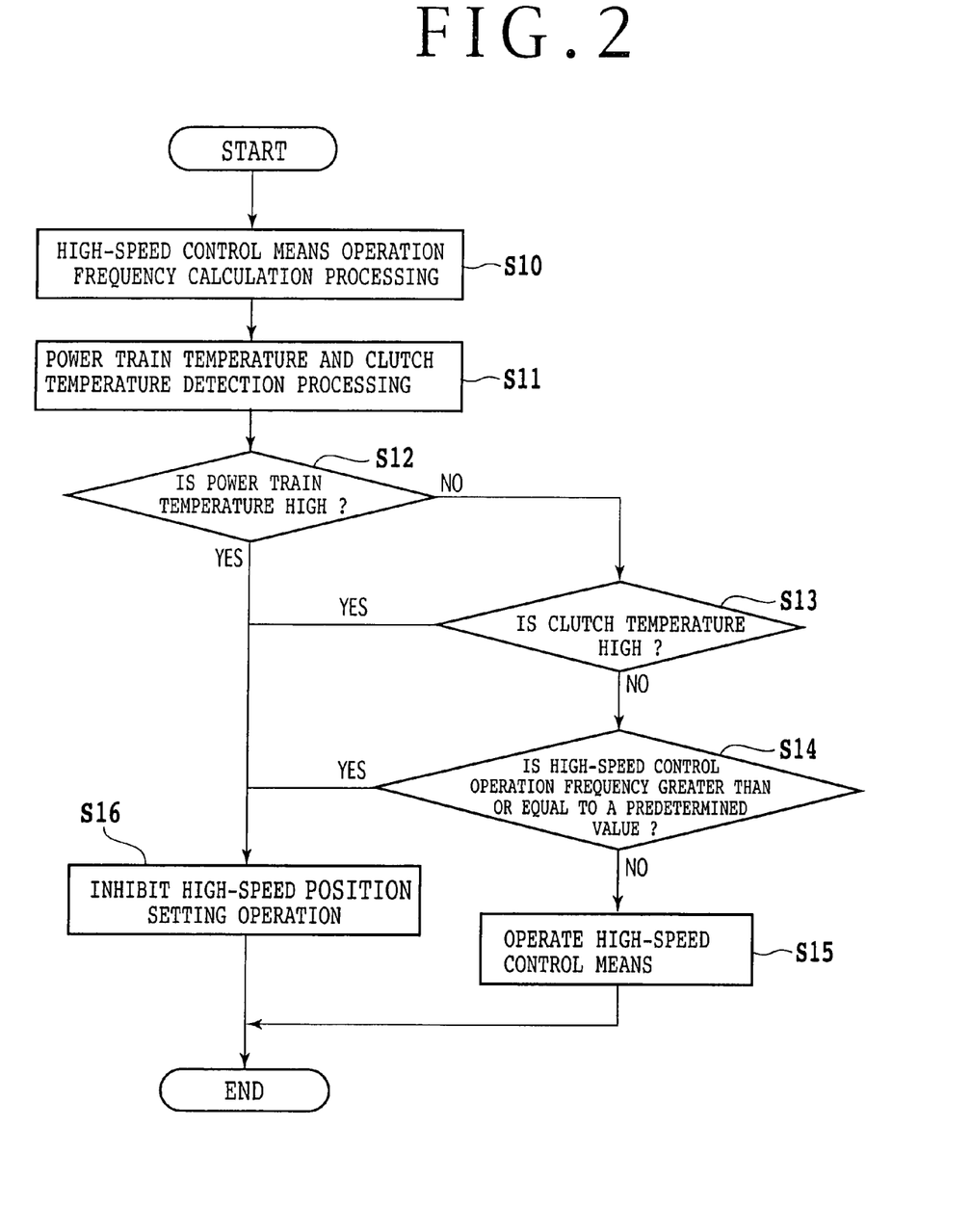
FIG. 2 is a flowchart showing the control by the first preferred embodiment.
Figure 3:
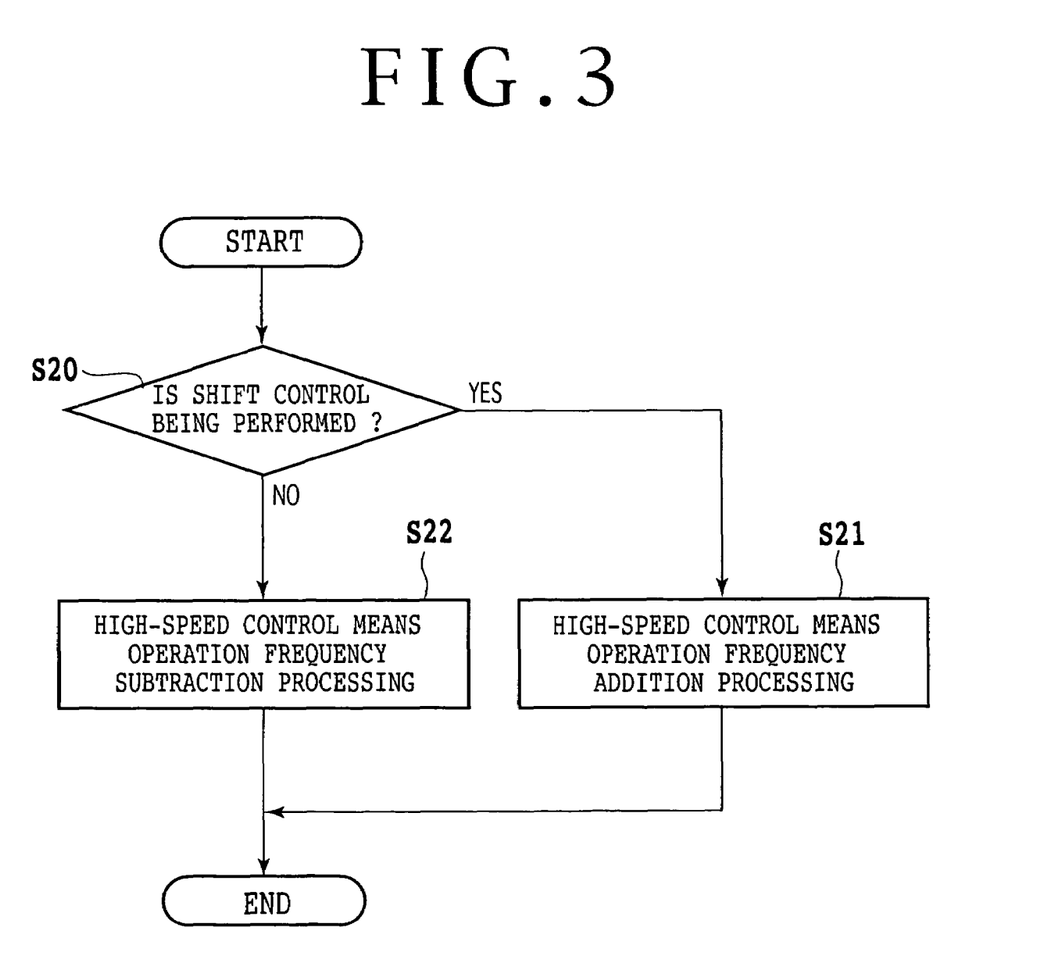
FIG. 3 is a flowchart showing high-speed control means operation frequency calculation processing.

Referring again to the flowchart shown in FIG. 2, power train temperature detection processing and clutch temperature detection processing are performed in step S11. The power train temperature detection is realized by detecting the temperature of the working fluid for the transmission or the temperature of engine cooling water. The clutch temperature detection is realized by detecting the temperature of the clutch for each shift position. In step S12, it is determined whether or not the power train temperature detected in step S11 is high. For example, in the case that the temperature of the working fluid for the transmission is detected as the detection of the power train temperature, it is determined whether or not the temperature of the working fluid for the transmission is greater than or equal to 115° C. in step S12.

If the power train temperature detected in step S11 is not high, e.g., if the temperature of the working fluid for the transmission is less than 115° C. in step S12, the program proceeds to step S13 to determine whether or not the temperature of the clutch for each high-speed position is high. The high temperature of each clutch depends on the size of each clutch, for example, so that an optimum value for the high temperature for each clutch is set. If the answer in step S13 is negative, the program proceeds to step S14 to determine whether or not the high-speed control operation frequency is greater than a predetermined value. For example, in the case that the number of operations of the clutch for a high-speed position per given time is detected, it is determined whether or not the number of operations of the clutch per 800 ms is greater than a predetermined value. As a modification, in the case that the time of operations of the clutch for a high-speed position per given time is detected, it is determined whether or not the total time of operations of the clutch for the high speed position per 800 ms is greater than a predetermined value.

Figure 4:
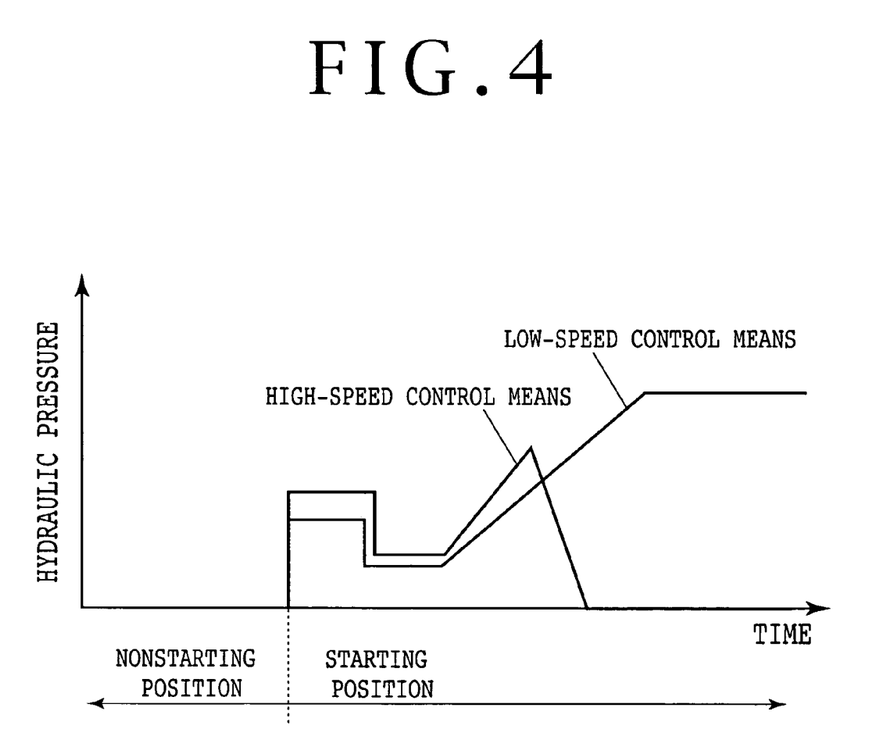
FIG. 4 is a graph showing the operation of the start control means in performing the in-gear control.

If the answer in step S14 is negative, the program proceeds to step S15 to operate the high-speed control means. In this case, both the low-speed control means and the high-speed control means are operated as shown in FIG. 4. In other words, the squat control known in the art is performed to thereby smoothen an output torque change in selecting the forward range, thus reducing a shift shock in performing the in-gear control. In this preferred embodiment, the combination of the low-speed control means and the high-speed control means is referred to as the start control means.

Figure 5:
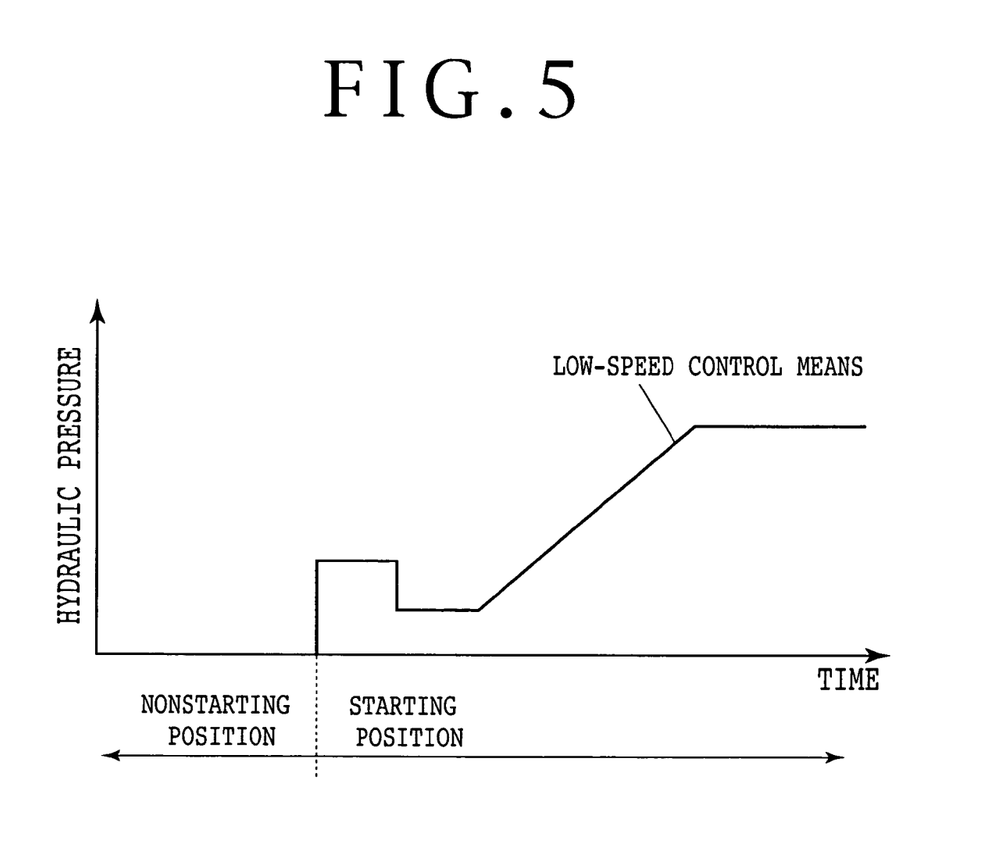
FIG. 5 is a graph showing the operation of the start control means in the case of inhibiting a high-speed position setting operation.

If the power train temperature is high in step S12, if the clutch temperature is high in step S13, or if the high-speed control operation frequency is greater than the predetermined value in step S14, the program proceeds to step S16 to inhibit the high-speed position setting operation. In this case, the operation of the high-speed control means is inhibited, and only the low-speed control means is operated at the starting position as shown in FIG. 5. Accordingly, it is possible to prevent a reduction in controlled hydraulic pressure responsive to a control command value due to a reduction in viscosity of the control fluid (working fluid) when the power train temperature is high or the high-speed position clutch temperature is high. As a result, it is possible to prevent a degradation in starting characteristics when the power train temperature or the high-speed position clutch temperature is high.

Figure 6:
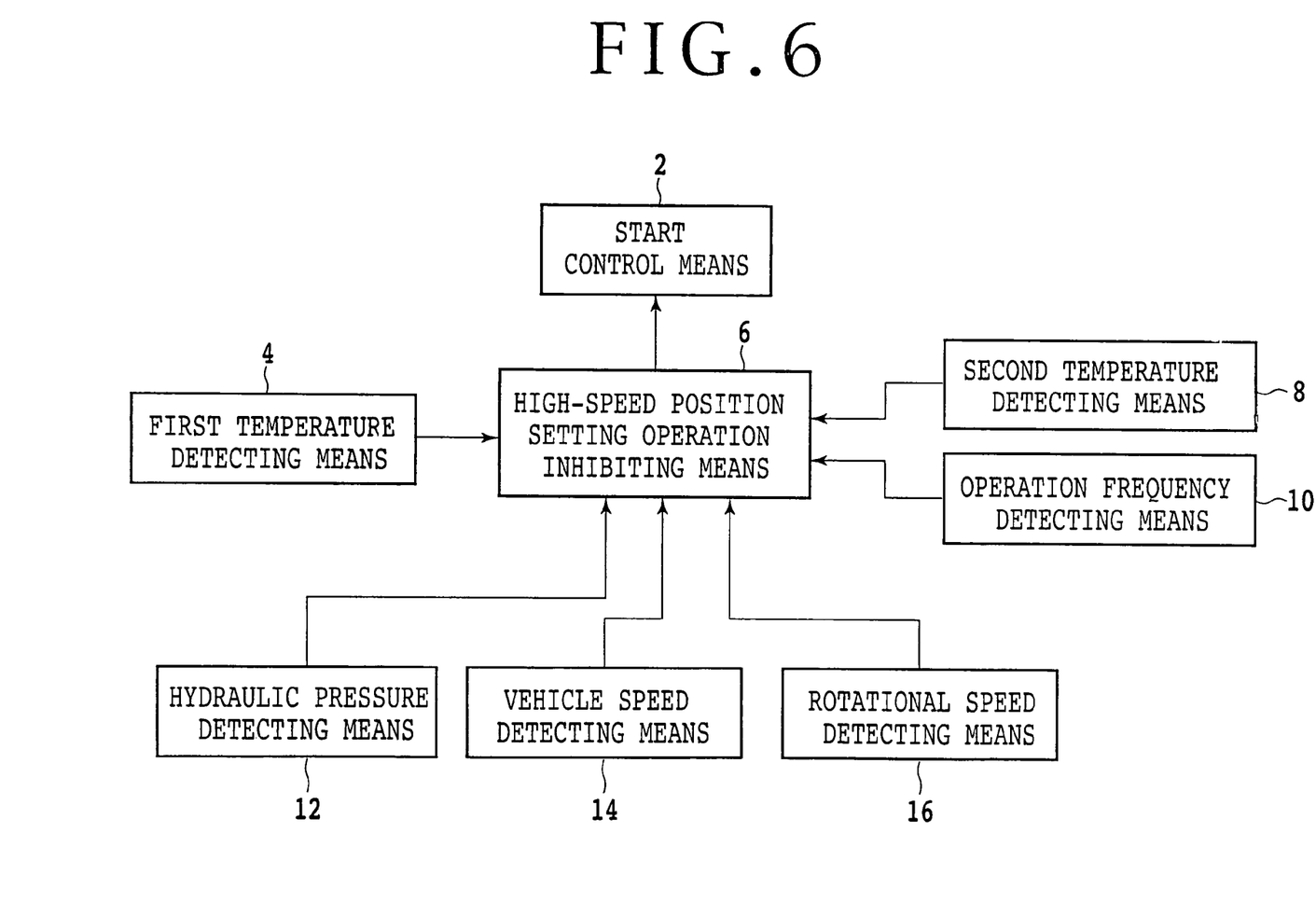
FIG. 6 is a block diagram showing the configuration of a second preferred embodiment of the present invention.

FIG. 6 is a block diagram of a control device for an automatic transmission according to a second preferred embodiment of the present invention. The control device according to this preferred embodiment includes hydraulic pressure detecting means 12, vehicle speed detecting means 14, and rotational speed detecting means 16 in addition to the components of the first preferred embodiment shown in FIG. 1. The hydraulic pressure detecting means 12 is provided to detect a hydraulic pressure to be supplied to the second hydraulic engaging element. The vehicle speed detecting means 14 is provided to detect a vehicle speed. The rotational speed detecting means 16 is provided to detect the rotational speed of an input shaft of the automatic transmission.

In this preferred embodiment, the high-speed position setting operation of the start control means 2 is inhibited by the high-speed position setting operation inhibiting means 6 in the case that the temperature detected by the first temperature detecting means 4 is greater than or equal to a predetermined value, that the hydraulic pressure detected by the hydraulic pressure detecting means 12 is less than a predetermined value in a given period of time, that the vehicle speed detected by the vehicle speed detecting means 14 is less than or equal to a predetermined value, and that the rotational speed detected by the rotational speed detecting means 16 is greater than a predetermined value.

Also in the case that the temperature of the second hydraulic engaging element detected by the second temperature detecting means 8 is higher than a predetermined value or that the operation frequency of the second hydraulic engaging element detected by the operation frequency detecting means 10 is higher than a predetermined value, the high-speed position setting operation of the start control means 2 is inhibited by the high-speed position setting operation inhibiting means 6. As in the first preferred embodiment shown in FIG. 1, the operation frequency detecting means 10 detects the number of operations of the second hydraulic engaging element per given time or detects the time of operations of the second hydraulic engaging element per given time.

A control method by the control device according to the second preferred embodiment will now be described in detail with reference to the flowchart of FIG. 7. In step S30, high-speed control means operation frequency calculation processing is executed. This step S30 is similar to the step S10 in the flowchart of FIG. 2, so the detailed description thereof will be omitted herein. In step S31, power train temperature detection processing and clutch temperature detection processing are executed. This step S31 is similar to the step S11 in the flowchart of FIG. 2, so the detailed description thereof will be omitted herein.

In step S32, it is determined whether or not the start control is being performed. In other words, it is determined whether or not the in-gear control by the select operation from the nonforward range to the forward range is being performed. If the answer in step S32 is negative, i.e., if the in-gear control is not being performed, the program proceeds to step S33 to set a timer T for t, e.g., 200 ms. If the answer in step S32 is affirmative, i.e., if the in-gear control is being performed, the program proceeds to step S34 to determine whether or not the temperature of the power train is high. This step S34 is similar to the step S12 in the flowchart of FIG. 2, so the detailed description thereof will be omitted herein.

If the answer in step S34 is negative, the program proceeds to step S35 to determine whether or not the temperature of the clutch for each high-speed position is high. This step S35 is similar to the step S13 in the flowchart of FIG. 2, so the detailed description thereof will be omitted herein. If the answer in step S35 is negative, the program proceeds to step S36 to determine whether or not the high-speed control operation frequency is greater than or equal to a predetermined value. This step S36 is similar to the step S14 in the flowchart of FIG. 2, so the detailed description thereof will be omitted herein.

If the answer in step S36 is negative, the program proceeds to step S37 to operate the high-speed control means. This step S37 is similar to the step S15 in the flowchart of FIG. 2, and the squat control shown in FIG. 4 is performed. In other words, in performing the in-gear control by the select operation from the nonforward range to the forward range, a hydraulic pressure is supplied both to the clutch for the low-speed position (first-speed position) and to the clutch for a given high-speed position, thereby first setting the shift position to the high-speed position and next switching the high-speed position to the low-speed position. Accordingly, an output torque change in the select operation from the nonforward range to the forward range can be smoothened to thereby reduce a shift shock in performing the in-gear control.

On the other hand, if the answer in step S34 is affirmative, i.e., if the temperature of the power train is high, the program proceeds to step S38 to determine whether or not the time t set in the backward timer T has become zero. As mentioned above, the time t in the timer T is set to 200 ms, for example, for the purpose of preventing improper determination immediately after the start control. If the answer in step S38 is negative, the program proceeds to step S37 to operate the high-speed control means. If the answer in step S38 is affirmative, the program proceeds to step S39 to determine whether or not the hydraulic pressure for the high-speed control means is greater than or equal to a predetermined value. In other words, it is determined whether or not the hydraulic pressure to be supplied to the clutch for the high-speed position has become greater than or equal to a predetermined value in a given period of time. If the answer in step S39 is affirmative, the program proceeds to step S37 to operate the high-speed control means, thereby performing the squat control.

If the answer in step S39 is negative, i.e., if the hydraulic pressure to be supplied to the clutch for the high-speed position is less than the predetermined value in the given period of time, the program proceeds to step S40 to determine whether or not the vehicle speed is less than or equal to a predetermined value, e.g., 20 km/h. If the vehicle speed is greater than the predetermined value, the program proceeds to step S37 to operate the high-speed control means. If the vehicle speed is less than or equal to the predetermined value, the program proceeds to step S41 to determine whether or not the rotational speed of the input shaft of the transmission is less than or equal to a predetermined value, e.g., 300 rpm. This predetermined value of 300 rpm corresponds to an engine idling speed of about 500 rpm. If the rotational speed of the input shaft is less than or equal to the predetermined value, the program proceeds to step S37 to operate the high-speed control means, thereby performing the squat control.

If the rotational speed of the input shaft is greater than the predetermined value, the program proceeds to step S42 to inhibit the high-speed position setting operation. In other words, the operation of the high-speed control means is inhibited and only the low-speed control means is operated as shown in FIG. 5. Accordingly, when the temperature of the power train is high, a controlled hydraulic pressure to the start control means can be stably supplied in response to a control command value, thereby preventing a degradation in starting characteristics. Further, also in the case that the temperature of the clutch for the high-speed position is high in step S35 or in the case that the high-speed control operation frequency is greater than or equal to the predetermined value in step S36, the program proceeds to step S42 to inhibit the high-speed position setting operation.

Figure 7:
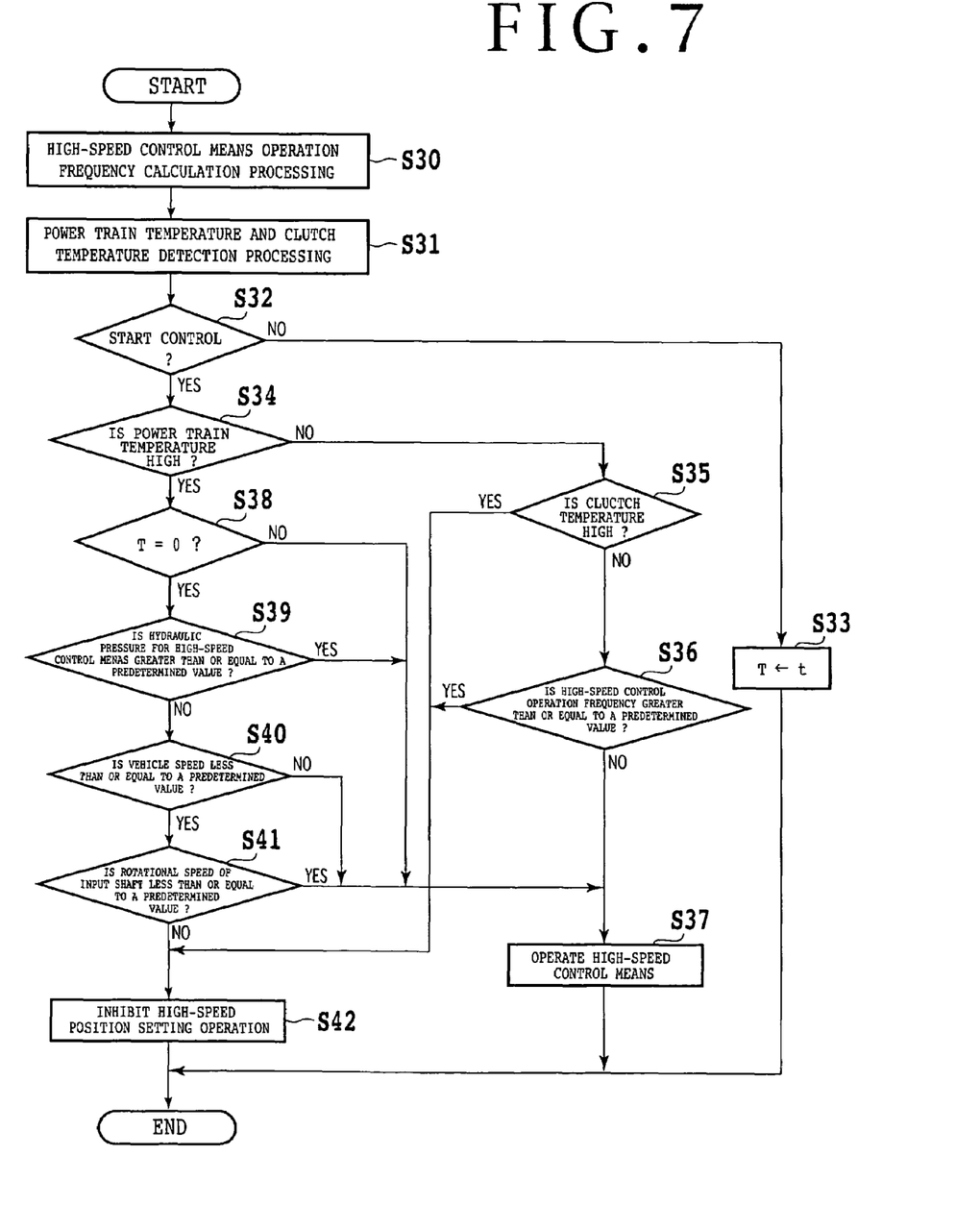
FIG. 7 is a flowchart showing the control by the second preferred embodiment.

The control flow shown in FIG. 7 is a control flow in the best mode, and the present invention is not limited to the best mode shown. For example, the steps S40 and S41 may be omitted, wherein in the case that the temperature of the power train is greater than or equal to a predetermined value and that the hydraulic pressure to be supplied to the high-speed position clutch is less than a predetermined value in a given period of time, the program proceeds to step S42 to inhibit the high-speed position setting operation.

As another modification, the step S39 may be omitted, wherein in the case that the temperature of the power train is greater than or equal to a predetermined value, that the vehicle speed is less than or equal to a predetermined value, and that the rotational speed of the input shaft of the transmission is greater than a predetermined value, the program proceeds to step S42 to inhibit the high-speed position setting operation.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A control device for a hydraulic automatic transmission for a vehicle, comprising:
    start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position;
    temperature detecting means for detecting the temperature of a power train; and
    high-speed position setting operation inhibiting means for inhibiting a high-speed position setting operation by said start control means in case that the temperature detected by said temperature detecting means is greater than or equal to a predetermined value.

2. A control device for a hydraulic automatic transmission for a vehicle, comprising:
    start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position;
    temperature detecting means for detecting the temperature of a power train;
    hydraulic pressure detecting means for detecting a hydraulic pressure to be supplied to said second hydraulic engaging element; and
    high-speed position setting operation inhibiting means for inhibiting a high-speed position setting operation by said start control means in case that the temperature detected by said temperature detecting means is greater than or equal to a predetermined value and that the hydraulic pressure detected by said hydraulic pressure detecting means is less than a predetermined value in a given period of time.

3. A control device for a hydraulic automatic transmission for a vehicle, comprising:
    start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position;

temperature detecting means for detecting the temperature of a power train;

vehicle speed detecting means for detecting a vehicle speed;

rotational speed detecting means for detecting the rotational speed of an input shaft of said transmission; and high-speed position setting operation inhibiting means for inhibiting a high-speed position setting operation by said start control means in case that the temperature detected by said temperature detecting means is greater than or equal to a predetermined value, that the vehicle speed detected by said vehicle speed detecting means is less than or equal to a predetermined value, and that the rotational speed detected by said rotational speed detecting means is greater than a predetermined value.

4. A control device for a hydraulic automatic transmission for a vehicle, comprising:

start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position;

temperature detecting means for detecting the temperature of a power train;

hydraulic pressure detecting means for detecting a hydraulic pressure to be supplied to said second hydraulic engaging element;

vehicle speed detecting means for detecting a vehicle speed;

rotational speed detecting means for detecting the rotational speed of an input shaft of said transmission; and high-speed position setting operation inhibiting means for inhibiting a high-speed position setting operation by said start control means in case that the temperature detected by said temperature detecting means is greater than or equal to a predetermined value, that the hydraulic pressure detected by said hydraulic pressure detecting means is less than a predetermined value in a given period of time, that the vehicle speed detected by said vehicle speed detecting means is less than or equal to a predetermined value, and that the rotational speed detected by said rotational speed detecting means is greater than a predetermined value.

5. A control device for a hydraulic automatic transmission for a vehicle, comprising:

start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position;

temperature detecting means for detecting the temperature of said second hydraulic engaging element; and high-speed position setting operation inhibiting means for inhibiting a high-speed position setting operation by said start control means in case that the temperature detected by said temperature detecting means is greater than a predetermined value.

6. A control device for a hydraulic automatic transmission for a vehicle, comprising:

start control means for supplying a hydraulic pressure to a first hydraulic engaging element for a low-speed position and a second hydraulic engaging element for a high-speed position in performing in-gear control by a select operation from a nonforward range to a forward range, thereby first setting a shift position to the high-speed position and next switching the high-speed position to the low-speed position;

operation frequency detecting means for detecting the frequency of operations of said second hydraulic engaging element; and high-speed position setting operation inhibiting means for inhibiting a high-speed position setting operation by said start control means in case that the frequency of operations detected by said frequency operation detecting means is greater than a predetermined value.

7. The control device according to claim 6, wherein said operation frequency detecting means detects the number of operations of said second hydraulic engaging element per given time.

8. The control device according to claim 6, wherein said operation frequency detecting means detects the time of operations of said second hydraulic engaging element per given time.

* * * * *